(12) United States Patent
Morse et al.

(10) Patent No.: US 8,991,718 B1
(45) Date of Patent: Mar. 31, 2015

(54) DECODING A TRANSFORMED MACHINE READABLE IMAGE

(75) Inventors: Reed Morse, Palo Alto, CA (US); Kareem Nassar, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 13/464,270

(22) Filed: May 4, 2012

(51) Int. Cl.
*G06K 19/06* (2006.01)

(52) U.S. Cl.
CPC .................. *G06K 19/06046* (2013.01)
USPC .... 235/494; 235/375; 235/462.1; 235/462.11

(58) Field of Classification Search
CPC ................................................ G06K 19/06046
USPC ........................... 235/375, 462.1, 462.11, 494
See application file for complete search history.

(56) References Cited

U.S. PATENT DOCUMENTS

| | | | |
|---|---|---|---|
| 2003/0161475 A1* | 8/2003 | Crumly et al. | 380/280 |
| 2006/0097062 A1* | 5/2006 | Cheong et al. | 235/494 |
| 2011/0029364 A1* | 2/2011 | Roeding et al. | 705/14.16 |

* cited by examiner

*Primary Examiner* — Thien M Le
*Assistant Examiner* — Toan Ly
(74) *Attorney, Agent, or Firm* — Johnson, Marcou & Isaacs, LLC

(57) ABSTRACT

A method, apparatus, and computer-readable medium for decoding transformed machine readable images is disclosed. A reader device can acquire a machine readable image that is transformed. A configuration module can reconfigure the transformed image to a form that renders the data in the image accessible by the reader device. A read module can decode the reconfigured machine readable image to retrieve the data contained in the image.

18 Claims, 9 Drawing Sheets

US 8,991,718 B1

DECODING A TRANSFORMED MACHINE READABLE IMAGE

FIELD OF INVENTION

This disclosure relates generally to machine readable images and, in one example embodiment, to a system, method and an apparatus for decoding a transformed machine readable image.

BACKGROUND

In the today's digital world, businesses may often use machine readable images (e.g., QR codes) for customer advertising. The machine readable images may represent and/or be encoded with data relevant to the businesses, which can be decoded using a computing device (e.g., a smart phone) that has an appropriate decoder application. The businesses may intend only specific users to access and/or process the machine readable image (e.g., when used for loyalty marketing). However, easy access of decoder applications and dissemination of portable computing devices (e.g., smart phones) may limit the ability of businesses to control the access to the machine readable images. Further, readily available technology (e.g., QR code decoder applications) may lead to easy access of the machine readable images and the associated data by unintended users (e.g., users that don't take part in the loyalty program).

Devising a new and more secure machine readable image may limit the unauthorized access. However, market adoption of the new machine readable image may be both cost and time prohibitive. Further, there may be numerous existing machine readable image formats which may render a new machine readable image unwarranted.

On the basis of the foregoing, there exists a need for a technology that may facilitate controlling the access of already existing (or extensively implemented) machine readable images to intended users as recognized by the businesses.

SUMMARY

A method, apparatus, and computer-readable medium for decoding transformed machine readable images is disclosed. In one embodiment, the method can comprise an input module of a reader device acquiring a transformed machine readable image. In its transformed state, the data represented by the machine readable image is inaccessible. A configuration module can reconfigure the transformed machine readable image to a form that renders the data accessible by the reader device. A read module of the reader device can decode the reconfigured machine readable image to retrieve the data contained in the image.

In another embodiment, an input module of a reader device can capture a machine readable image encoded with a message. A test module can recognize that the machine readable image has been transformed to render the encoded message inaccessible. A configuration module can reconfigure the transformed machine readable image to a form that a read module can decode in order to retrieve the encoded message.

In yet another embodiment, an input module of a reader device can capture a machine readable image encoded with a message. A test module can recognize that the machine readable image has been transformed to render the encoded message inaccessible. The transformed machine readable image can be transmitted to a server to reconfigure and decode the machine readable image in order to retrieve the encoded message.

In yet another embodiment, a second machine readable image is generated by transforming a first machine readable image, the transforming step rendering data encoded in the first machine readable image inaccessible. A configuration module can transform the second machine readable image back to the first machine readable image so that a reader device can decode the first machine readable image and retrieve the data contained therein.

These and other embodiments will become apparent upon consideration of the exemplary embodiments described in the following detailed description and drawings.

BRIEF DESCRIPTION OF DRAWINGS

Example embodiments are illustrated by way of example and not limitation in the figures of accompanying drawings, in which.

Figure 1:
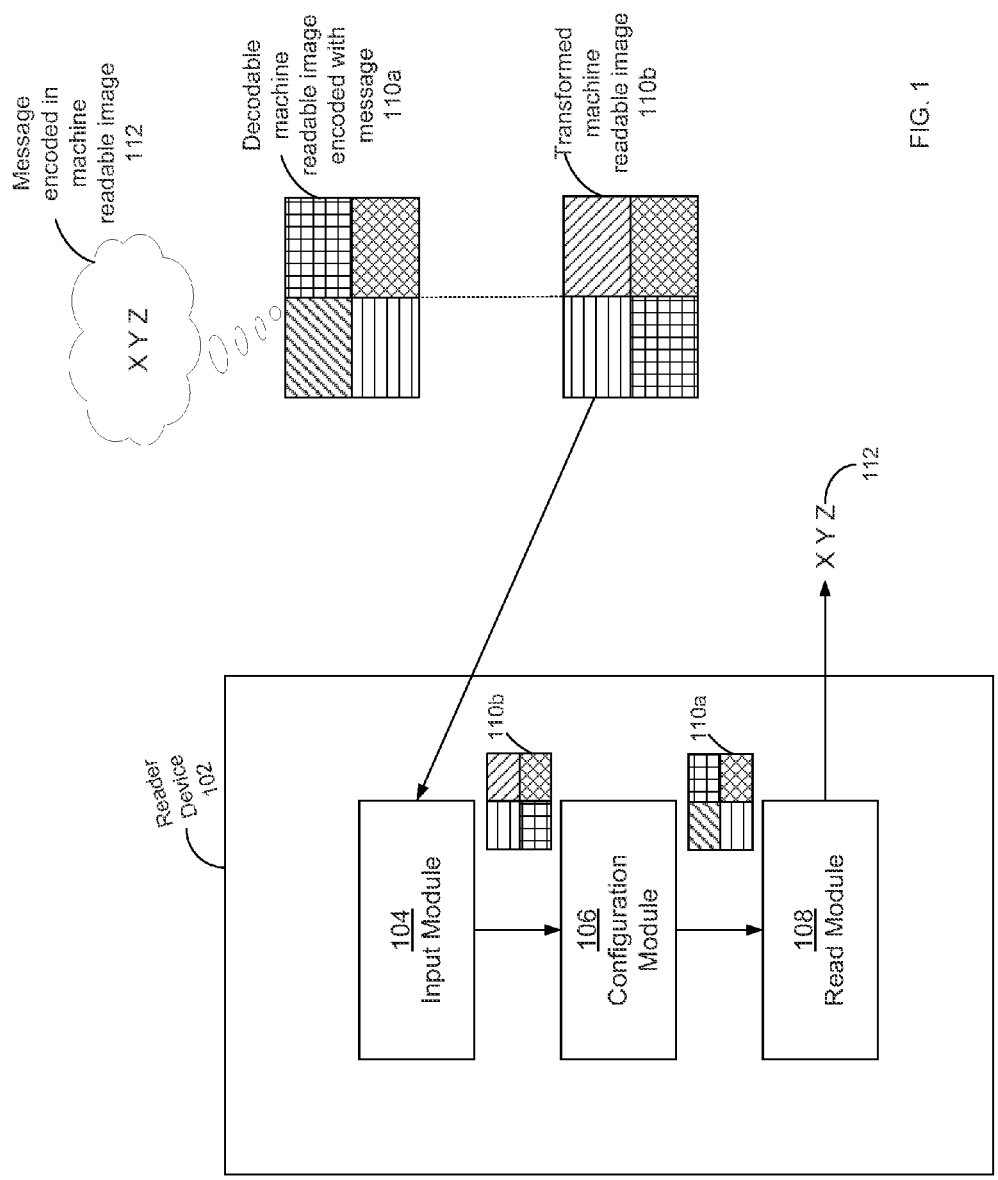
FIG. 1 illustrates a system for decoding transformed machine readable images, according to one or more exemplary embodiments.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION

Disclosed is a method, apparatus and system for decoding transformed machine readable images. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

The term "machine readable image" as used herein can generally refer to any appropriate image based representation of data. In an example embodiment, the machine readable image may refer to a QR code. One of ordinary skill in the art will appreciate that while QR code is specifically recited, other functionally equivalent codes may be substituted for the QR code in the present invention. Other functionally equivalent codes can include, but is not limited to linear symbologies, two dimensional symbologies, color code, two dimensional bar code, three dimensional barcode, superCode and Ultracode.

A machine readable image 110a (hereinafter "image") may be encoded with data 112, that can be retrieved by decoding the image 110a. The data 112 may be a plain text and/or a set of instructions. For example, a QR code may be encoded with plain text "Loyal" or with a set of instructions to grant a loyalty point to a user. The image 110a may be decodable using any appropriate reader device (with or without a configuration module 106, shown in FIG. 1) configured to decode the image 110a to retrieve the data 112. For example, if the image 110a is a QR code, the reader device may be any QR code reader or QR code decoder application.

In one embodiment, the image 110a may be transformed to render the data 112 represented by the image 110a inaccessible to a reader device that does not possess appropriate know-how to reconfigure the transformed image 110b to a form from which the data 112 may be retrieved. The appropriate know-how (e.g., configuration module 106, shown in FIG. 1) may be embodied as a software module, hardware or a combination of both. The configuration module 106 may refer to a set of instructions (or hardware or a combination of both hardware and software) that allows the reader device 102 to reconfigure transformed image 110b. Once the transformed image 110b is reconfigured, the reconfigured image (e.g., image 110a) may be decodable by the reader device 102 to retrieve a data represented by a base image (e.g., image 110a). The image 110a may be transformed using any appropriate data processing device. The process of transformation is described in greater detail in the following paragraphs. Further, the process of using the configuration module 106 installed in the reader device 102 to reconfigure the transformed image 110b is described in greater detail below, in association with FIG. 1.

In the example embodiment of FIG. 1, image 110a may be transformed to image 110b. In one embodiment, the image 110b may be non-decodable by a reader device that does not include the configuration module 106. For example, the reader device may not recognize a pattern of the transformed image 110b any thereby be unable to decode the transformed image 110b. In some embodiments, the transformed image 110b may be decodable by a reader device that does not include the configuration module 106 and data may be retrieved by decoding the transformed image 110b, but the data obtained from decoding the transformed image 110b may not be equivalent to the data 112 encoded in the image 110a. For example, the reader device without the reader device 106 may recognize a pattern of the transformed image 110b as a QR code and decode the image 110b, but the data in the transformed image 110b may be a scrambled version of the data 112 encoded in the image 110a.

TRANSFORMING THE IMAGE

An image (e.g., image 110a) can be transformed by changing any appropriate modifiable characteristic of the image. To mention a few examples of the modifiable characteristics of an image, without being exhaustive, the characteristics may include a color composition of the image, a color intensity of the image, a display of the image, a sharpness of the image, a color contrast of the image, a layout of the image, and/or a pixel arrangement of the image. In an example embodiment, the image 110a may be a QR code. Normally QR codes are dark patterns printed on light background. As one example, the QR code can be transformed by inverting its normal color pattern such that light patterns may be printed on dark backgrounds. As another example, a QR code may be divided up into four quadrants and those quadrants could then be shifted one quadrant clockwise to transform the QR code. These transformations may render the data represented by the QR code unreadable to a reader device that does not include a configuration module 106.

The method of transformation (e.g., which modifiable characteristic has been changed and how has it been changed) may facilitate forming the configuration module. Further, the method of transformation may facilitate generating a reconfiguration algorithm.

In one embodiment, a reconfiguration algorithm may aid in rearranging the transformed image 110b back to the base image (e.g., image 110a) that is decodable by the reader device 102. In another embodiment, the reconfiguration algorithm is operable to rearrange the transformed image 110b to any appropriate form that renders the data 112 retrievable by the reader device 102.

In one embodiment, the transformed image 110b may be rendered on any appropriate medium from which the transformed image 110b can be acquired using a reader device. For example, the transformed image 110b may be visually presented on any appropriate tangible medium such as on a paper, a purchasable product, a website, a billboard, or a display screen.

Turning to FIGS. 1-7, FIG. 1 illustrates a system for decoding transformed machine readable images, according to one or more exemplary embodiments. In particular, FIG. 1 illustrates a decodable machine readable image 110a encoded with a message or data 112, transformed machine readable image (hereinafter "transformed image") 110b, a reader device 102, an input module 104, a configuration module 106, and a read module 108.

Using an input module 104, the reader device 102 can acquire the transformed image 110b. Further, using the configuration module 106, the reader device 102 can reconfigure the transformed image 110b to a form that renders the message 112 accessible to the reader device 102. The reconfigured image may be decodable using the reader device 102. In one embodiment, the reconfigured image may be equivalent to the image 110a as illustrated in FIG. 1. In another embodiment, the reconfigured image may be different from the image 110a. Using the read module 108, the reader device 102 can decode the reconfigured image (e.g., image 110a) to retrieve a message 112 encoded in the image 110a.

The reader device 102 can acquire the transformed image 110b from an offline media, online media, and/or print media. In one embodiment, the transformed image 110b can be acquired by capturing the transformed image 110b using an integrated camera (or externally coupled camera) of the reader device 102. In another embodiment, the transformed image 110b can be downloaded from a website. In some embodiments, the transformed image 110b may be received from any appropriate computing device (e.g., another reader device, a desktop, etc.) over a wired and/or wireless communication link. The reader device 102 can store the transformed image 110b locally (e.g., memory 204) for further processing. In an alternate embodiment, the acquired image, in other words, the transformed image 110b, may be stored in an external memory, such as cloud storage for further processing.

In one embodiment, once the transformed image 110b is acquired, the input module 104 can forward the transformed image 110*b* to the configuration module 106 of the reader device 102. The configuration module 106 may reconfigure/rearrange the transformed image 110*b*, to a form that renders the data 112 accessible to the reader device 102. In an example embodiment, the reconfigured image may be equivalent to the image 110*a* recognizable by the reader device 102. Further, the reconfigured image may be decodable by the reader device 102.

In an example embodiment of FIG. 1, the configuration module 106 can forward the reconfigured image (e.g., image 110*a*) to the read module 108 of the reader device 102 that decodes the reconfigured image (e.g., 110*a*). The reconfigured image (e.g., image 110*a*) may be decoded to retrieve the data 112 represented by the image 110*a*. The reader device 102 is described in greater detail in association with FIG. 2.

Figure 2:
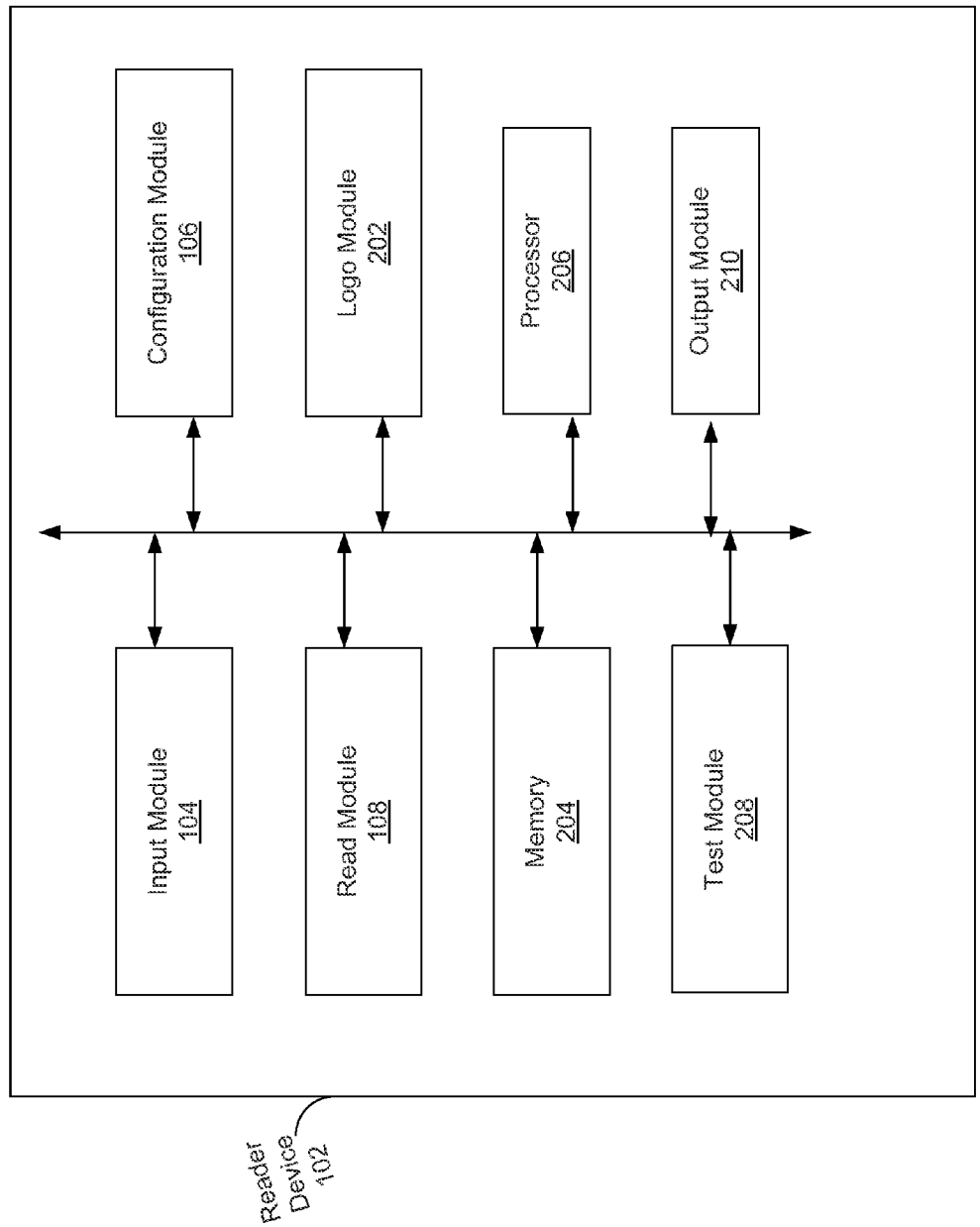
FIG. 2 illustrates an exploded view of the reader device, according to one or more exemplary embodiments.

Now referring to FIG. 1 and FIG. 2, FIG. 2 illustrates primary components of the reader device, according to one or more exemplary embodiments. In particular, FIG. 2 illustrates the input module 104, the configuration module 106, the read module 108, a logo module 202, a memory 204, a processor 206, a test module 208, and an output module 210.

In one embodiment, the reader device 102 may be a hardware device comprising circuitry that is configured to perform the operations of the reader device as described herein. In another embodiment, the reader device may be a computing device comprising a set of instructions embodied in a non-transitory storage medium of the mobile computing device, which when executed through a processor performs the operations of the reader device 102 as described herein. Accordingly, the different modules of the reader device 102 may be realized using hardware circuitry, software or a combination of both to perform respective operations.

The input module 104 is configured to acquire an image such as the transformed image 110*b*. In addition, the input module 104 can receive and/or process a user input related to a user's interaction with the reader device 102. Further, the input module 104 may receive an image and/or other data from external devices, such as other reader devices or computing devices, over a wired and/or wireless communication link. The input module 104 can include, but is not limited to, a touch screen, a keypad, an input port, a image capture arrangement (e.g., camera) and/or other features that aid a user to interact with the reader device 102. In one embodiment, the input module 104 can acquire the transformed image responsive to receiving user input through the input/output module 210. For example, a user can initiate capturing an image by using a touch screen or a keypad (e.g., input module 104). In one embodiment, the input module 104 can forward the acquired image (e.g., transformed image 110*b*) to the memory 204 to store the image for further processing. In another embodiment, the input module 104 can forward the acquired image (e.g., transformed image 110*b*) to any of the other modules for further processing, without storing the acquired image in the memory 204. In yet another embodiment, the input module 104 may forward the acquired image to the output module that is configured to store the acquired image in an external memory, such as cloud storage.

In one embodiment, the configuration module 106 is configured to receive and/or process the transformed image 110*b*, such that the data 112 is rendered retrievable by the reader device 102. Processing the transformed image can include reconfiguring (or rearranging) the transformed image 110*b*. The configuration module 106 may access the memory 204, processor and/or the other modules to aid in processing the transformed image 110*b*. The reconfigured image may be decodable by the reader device 102. Further, the configuration module 106 is configured to forward the reconfigured image to the read module 108.

The read module 108 can decode any appropriate decodable image. In one embodiment, the read module 108 is configured to decode the reconfigured image provided the reconfigurable image is decodable.

The test module 208 is configured to determine whether the acquired image is transformed. If the acquired image is transformed (e.g., transformed image 110*b*), the test module 208 can send the transformed image 110*b* to the configuration module 106. If the acquired image is not transformed and/or the acquired image is decodable, the test module 208 can forward the acquired image to the read module 108.

The logo module 202 is configured to scan the acquired image for any graphical identifiers embedded in the acquired image, such as a logo. The output module 210 is configured to communicate the data 112 to a user, once the data 112 is retrieved. The data 112 can be communicated to the user through an auditory, visual, tactile and/or olfactory means. In one embodiment, the output module 210 can be a transceiver to communicate with another computing device.

It should be appreciated that the components of the exemplary reader device 102 in FIG. 2 are merely an example. In other embodiments, reader device 102 may include different components. For example, alternate embodiments may not include the logo module 202.

In one embodiment, the memory 204 may be a non-volatile memory. In some embodiments, the memory 204 may be a volatile memory. In an alternate embodiment, the memory 204 may be external to the reader device 102. The reader device 102 may access the external memory through a wired and/or wireless communication link.

The processor 206 can aid any computational operations of the reader device 102. In one embodiment, the processor 206 may include a single core processor or a multi-core processor. In another embodiment, the processor 206 may include multiple single core. The operation of each module of the reader device 102 may be explained in further detail below, in association with FIG. 3.

Figure 3:
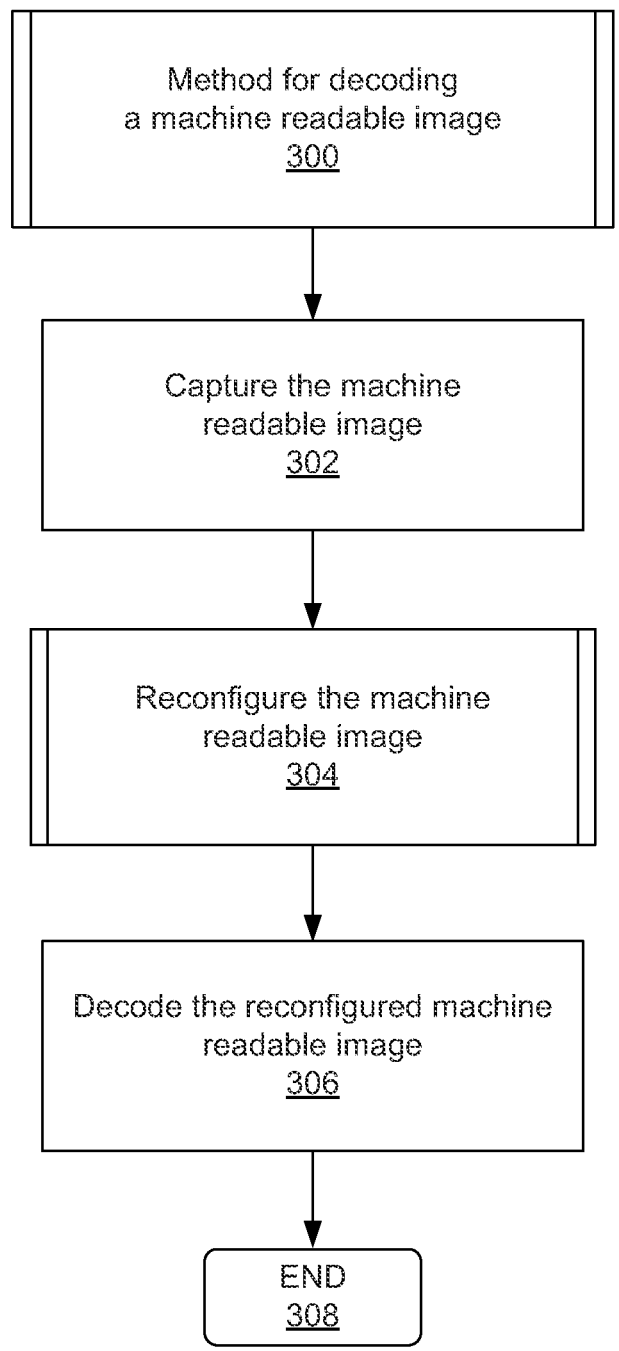
FIG. 3 illustrates a method for decoding transformed machine readable image, according to one or more exemplary embodiments.

Referring to FIG. 1 and FIG. 3, FIG. 3 illustrates a method for decoding a transformed machine readable image, according to one or more exemplary embodiments.

In operation 302, using the input module 104, a reader device 102 acquires the transformed image 110*b*. In operation 304, using the configuration module, the transformed image 110*b* can be reconfigured. Reconfiguring the transformed image 110*b* can include additional operations described in greater detail in association with FIG. 6 and FIGS. 7A-7B (collectively 'FIG. 7').

Figure 6A:
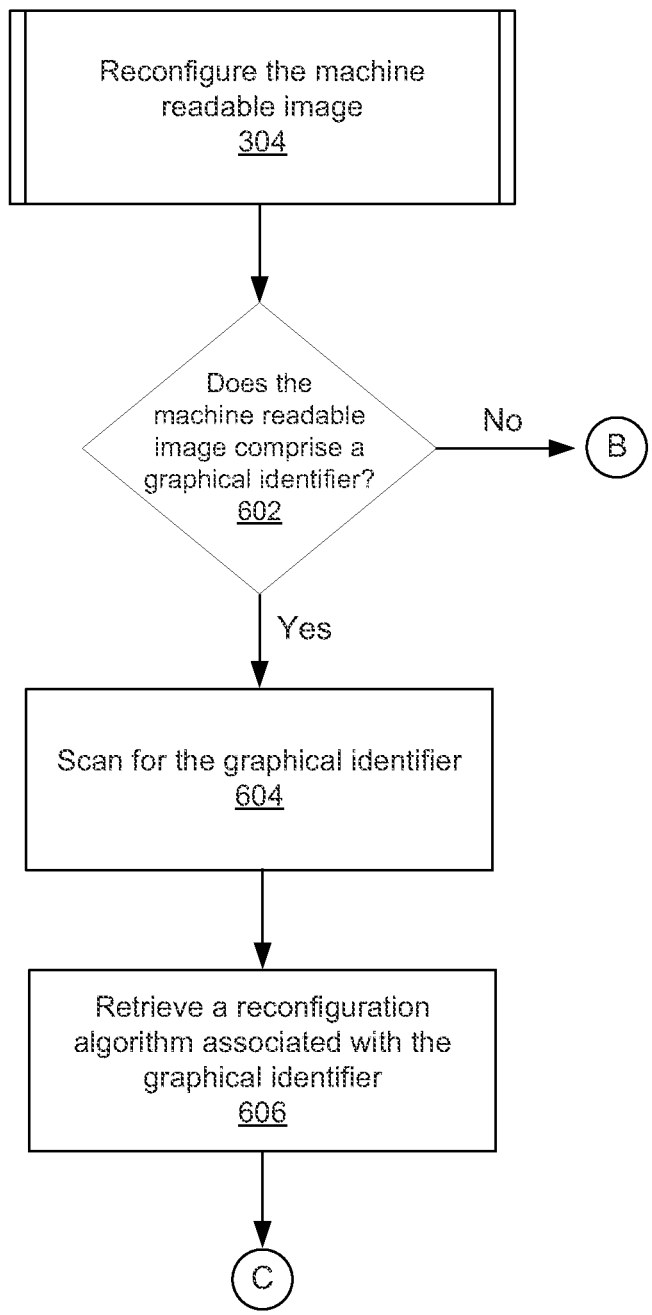
FIGS. 6A and 6B (collectively 'FIG. 6') illustrates a method of reconfiguring the transformed image based on a graphical identifier, according to one or more exemplary embodiments.
Figure 6B:
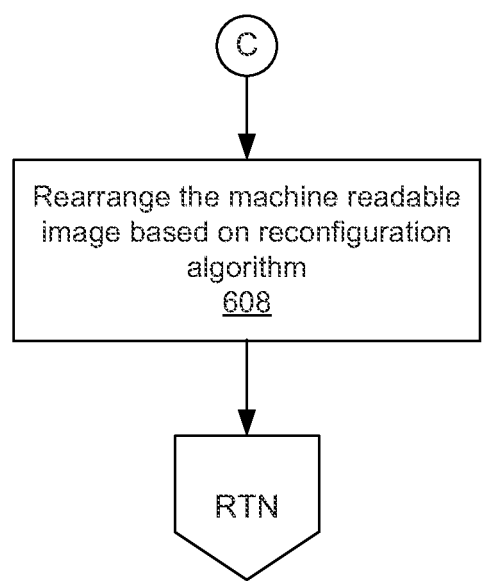

Referring now to FIG. 1, FIG. 3 and FIG. 6, FIG. 6 illustrates a method of reconfiguring the transformed image based on a graphical identifier, according to one or more exemplary embodiments. In one embodiment, the transformed image may include a graphical identifier. For example, a transformed QR code may include a Google logo. Each graphical identifier may be associated with a reconfiguration algorithm or a method in which an image 110*a* is transformed. In other words, the graphical identifier may indicate which modifiable characteristic has been changed and how has it been changed.

In operation 602, the logo module 202 may scan the transformed image 110*b* for a graphical identifier. If the transformed image 110*b* includes a graphical identifier, the method of reconfiguring the transformed image branches to operation 604.

In operation 604, once the reader device 102 recognizes the graphical identifier included in the transformed image, the reader device 102, using the configuration module 106, may retrieve a reconfiguration algorithm associated with the graphical identifier. The reconfiguration algorithm may be stored in the memory 204.

In an example embodiment, QR codes associated with entity X may include a logo specific to entity X. The QR codes associated with entity X may be arranged in a specific pattern that is standard to entity X. Further, entity X may have a reconfiguration algorithm that facilitate decoding the QR codes arranged in a pattern specific to entity X. These algorithms may be fed into the reader device memory. Once the reader device recognizes the entity X's logo, the configuration module may retrieve the reconfiguration algorithm specific to entity X.

In operation 606, using the reconfiguration algorithm associated with the graphical identifier, the configuration module 104 can reconfigure the transformed image 110b. The reconfigured image may be equivalent to the image 110a that is decodable. In another embodiment, the reconfigured image may be different from the image 110a, but still be decodable and can include the data 112.

Figure 7A:
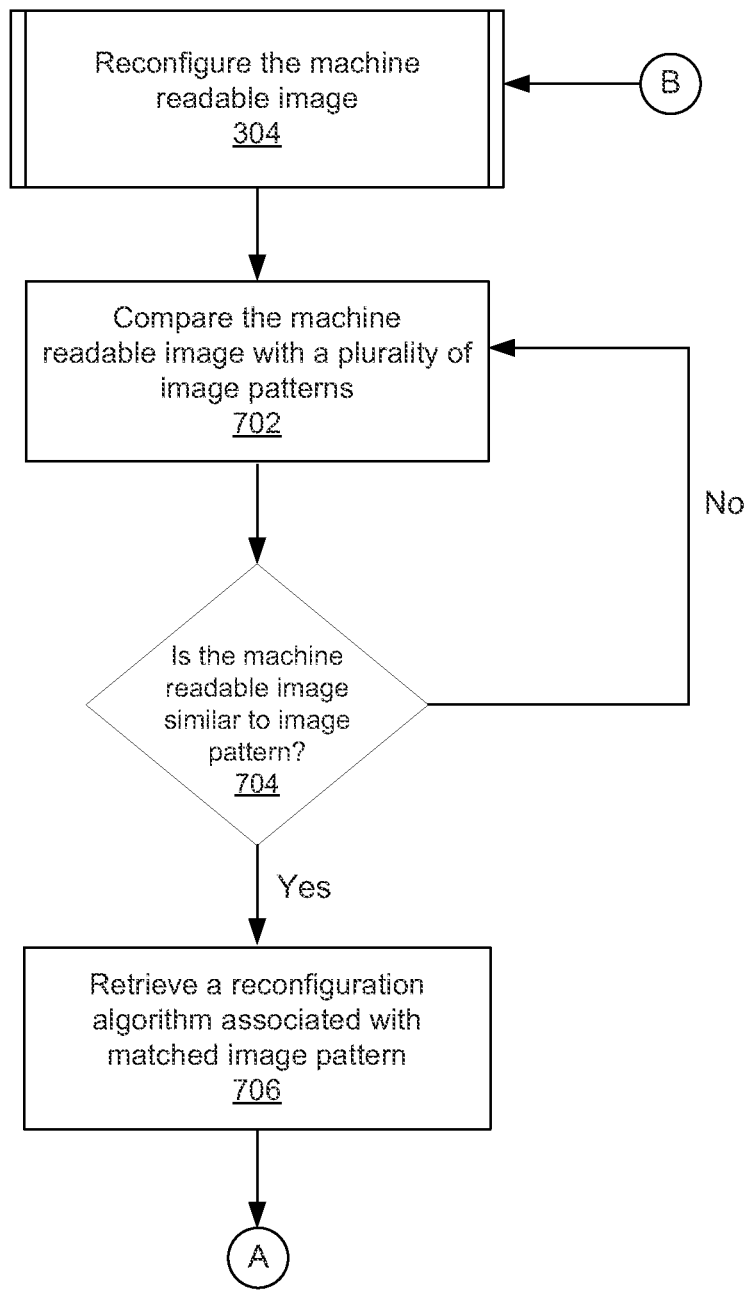
FIGS. 7A-7B (collectively 'FIG. 7') illustrates a method for reconfiguring a transformed image that does not include a graphical identifier, according to one or more exemplary embodiments.

If the transformed image 110b does not include a graphical identifier, the method of reconfiguring the transformed image branches to operation 702 of FIG. 7A.

Figure 7B:
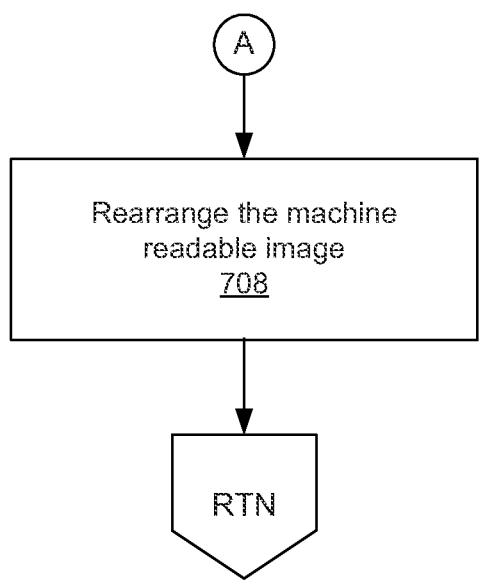

Referring now to FIG. 1, FIG. 3, FIG. 6 and FIGS. 7A-7B (collectively 'FIG. 7'), FIG. 7 illustrates a method for reconfiguring a transformed image that does not include a graphical identifier, according to one or more exemplary embodiments. In operation 702, the configuration module 106 of the reader device 102 can compare the transformed image 110b with an image pattern of one or more image patterns stored in the memory 204 of the reader device 102. In operation 704, the configuration module 106 can determine whether the transformed image 110b matches the image pattern of the one or more image patterns. Each image pattern may be associated with a reconfiguration algorithm that indicates how to reconfigure the transformed image 110b, if the transformed image 110b resembles any one of the plurality of image patterns.

If the transformed image does not match the image pattern of the one or more image patterns, then the configuration module compares the transformed image 110b with another image pattern of the one or more image patterns. The comparison continues until all the image patterns in the one or more image patterns is exhausted or until a matching image pattern is found. If no matching image is found (and the comparison has exhausted the one or more image pattern list) then using the output module, an error message may be communicated to the user. The error message may be in an auditory, visual, tactile and/or olfactory form.

In operation 706, when the transformed image matches with one of the image patterns stored in the memory of the reader device, the configuration module 106 retrieves the reconfiguration algorithm associated with the matching image pattern from the memory 204. Further, in operation 708, the transformed image 110b may be reconfigured by the processor 206 of the reader device 102 based on the reconfiguration algorithm. The reconfigured image may be forwarded to a read module 108 for further processing.

Referring back to FIG. 3. In operation 306, the read module 108 can receive the reconfigured image (e.g., image 110a). Further, the read module 108 can decode the reconfigured image to retrieve the data 112. In one embodiment, the data 112 may instruct the reader device 102 to perform an operation such as opening a website, playing a music file, displaying an image, set a reminder, provide a reward, etc. If the data 112 is associated with a reward program such as a loyalty program, then data 112 may be stored in a server externally (or in memory 204 locally) for future retrieval. The server may send additional reward messages to the reader device. The additional messages may be associated with data 112. Further, the reader device 102 can prompt a user to send the decoded data 112 to another user if applicable.

Figure 4:
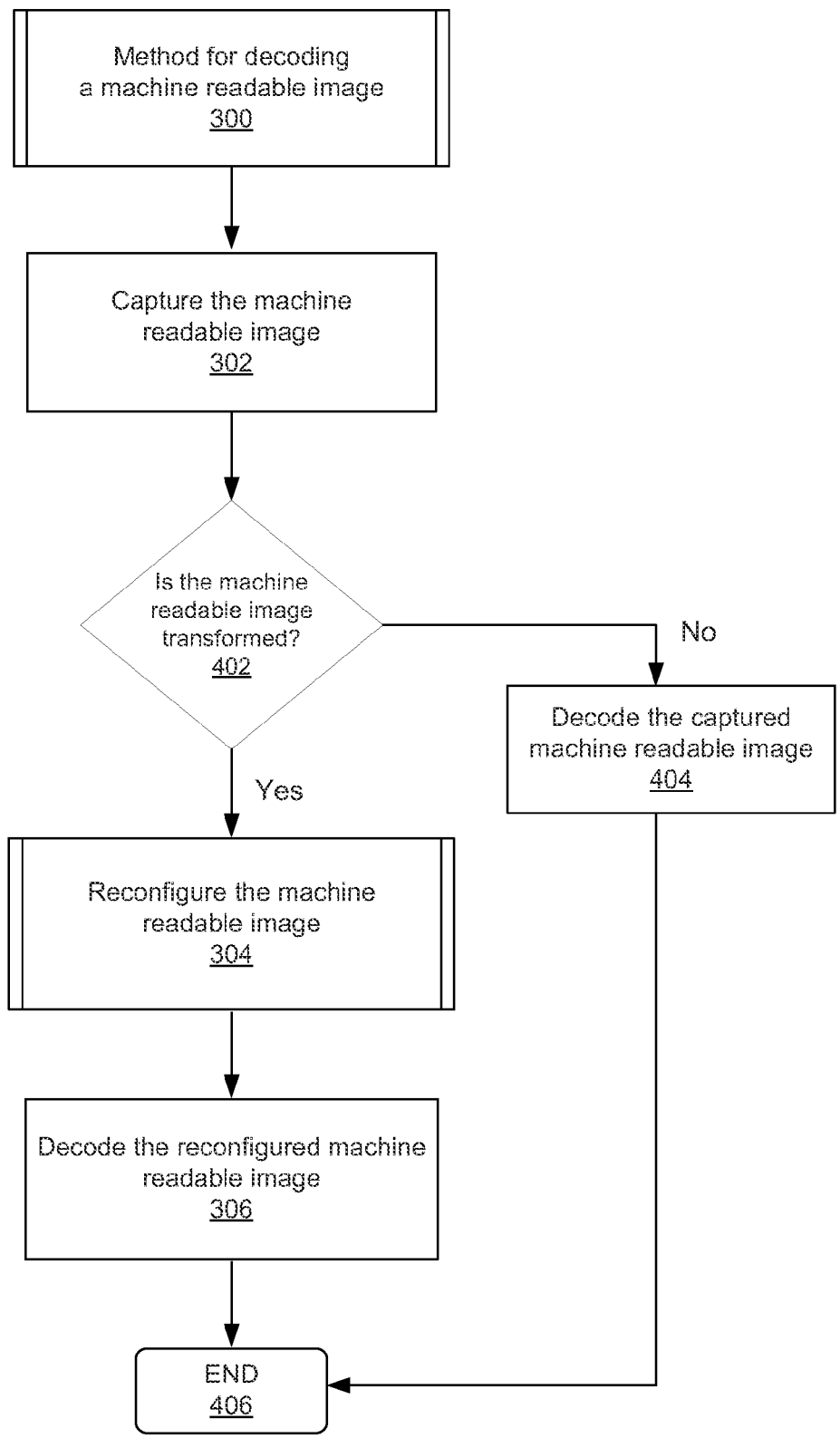
FIG. 4 illustrates another method of decoding transformed machine readable images, according to one or more exemplary embodiments.

Referring now to FIG. 1 and FIG. 4, FIG. 4 illustrates another method of decoding transformed machine readable images, according to one or more exemplary embodiments. In operation 302, the reader device 102 can acquire an image as described in FIG. 3. In operation 402, the test module 208 can determine whether the acquired image is a transformed rendition of a base image (e.g., image 110a). If it is determined that the acquired image is a transformed rendition (e.g., image 110b), then the transformed image 110b may be reconfigured and decoded as described in FIG. 3, FIG. 6 and FIG. 7. If it is determined that the acquired image is not a transformed rendition, the test module 208 can forward the acquired image to the read module 108. Further, in operation 404 the read module can decode the acquired image (provided the acquired image is decodable) to retrieve the data 112.

Figure 5:
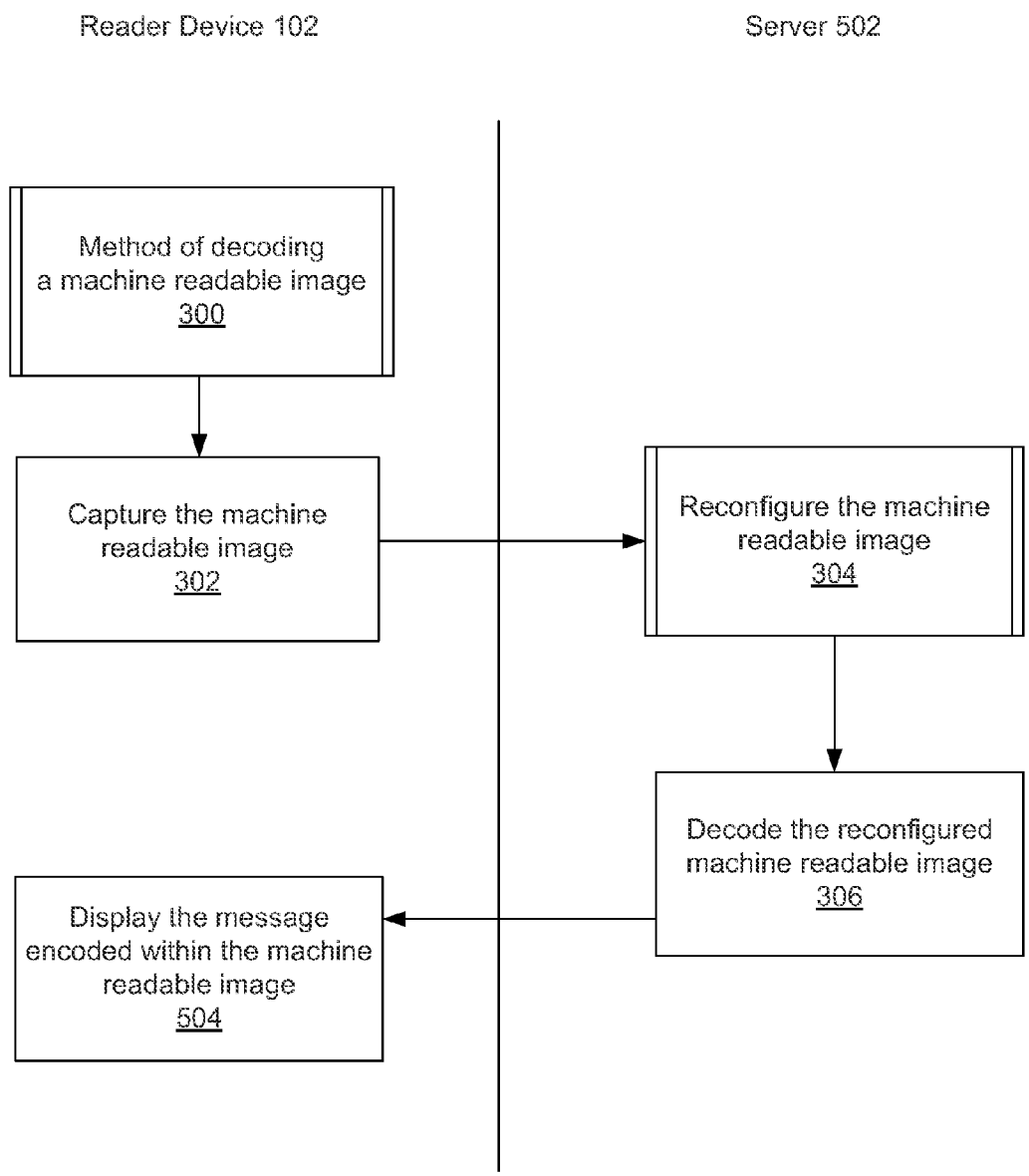
FIG. 5 illustrates a method of decoding transformed machine readable images using a server, according to one or more exemplary embodiments.

Referring now to FIG. 1 and FIG. 5, FIG. 5 illustrates a method of decoding transformed machine readable images using a server, according to one or more exemplary embodiments. In particular, FIG. 5 illustrates a reader device 102 and a server 502.

The server 502 may refer to a computing device at a remote location from the reader device 102. In one embodiment, the server 502 may be cloud based. The server 502 can be configured to perform one or more of the operations of a reader device 102 as applicable.

In operation 302, using the input module 104, the reader device 102 can acquire an image as described in FIG. 3. The output module 210 can transmit the acquired image to the server 502. In one embodiment, server 502 is configured to perform operation 304 where the acquired image is reconfigured. Further, the server 502 is configured to perform operation 306 where the reconfigured image is decoded to retrieve the data 112. In one embodiment, the server 502 can transmit the data 112 to the reader device 102.

Using the output module 210, the reader device 102 may receive the data 112. Further, in operation 504, the reader device 102 may communicate the data 112 to a user. The data 112 can be communicated to the user through an auditory, visual, tactile and/or olfactory means. In one embodiment, the data can also be communicated to another computing device.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in digital signal processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present inven- In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A computer implemented method comprising:
   acquiring, by an input module of a reader device, a machine readable image that is graphically transformed such that data represented by the machine readable image is inaccessible;
   graphically reconfiguring, by a configuration module of the reader device, the transformed machine readable image to a form that renders the data accessible by the reader device; and
   decoding, by a read module of the reader device, the reconfigured machine readable image to retrieve the data.

2. The method of claim 1, wherein reconfiguring the transformed machine readable image, further comprises:
   comparing, by the configuration module of the reader device, the transformed machine readable image with a plurality of image patterns stored in a memory of the reader device;
   finding a match between the transformed machine readable image and at least one of the plurality of image patterns stored in the memory of the reader device, wherein each image pattern of the plurality of image patterns is associated with a re-configuration algorithm; and
   rearranging the image based on the re-configuration algorithm associated with the at least one image pattern that matches with the transformed machine readable image.

3. The method of claim 1, wherein when the machine readable image comprises a graphical identifier, reconfiguring the transformed machine readable image further comprises:
   scanning, by a logo module of the reader device, the transformed machine readable image for the graphical identifier, wherein the graphical identifier is associated with a re-configuration algorithm; and
   rearranging, by a configuration module of the reader device, the transformed machine readable image based on the re-configuration algorithm associated with the graphical identifier.

4. The method of claim 1, further comprising:
   transmitting, by the reader device, the decoded message to a database of a server to store the decoded message when the message is associated with a reward program; and
   receiving, at the reader device, a plurality of messages associated with the decoded message transmitted from the server; and
   prompting a user of the reader device to transmit the decoded message to a reader device of another user over a wireless link.

5. The method of claim 1, further comprising:
   storing the machine readable image captured through the input module locally in the memory associated with the reader device;
   performing an operation that is associated with the decoded message as instructed in the decoded message when the decoded message comprises instructions to an operation comprised therein; and
   communicating, by an output module of the reader device, the message that is encoded within the machine readable image responsive to decoding the reconfigured machine readable image.

6. The method of claim 5, wherein performing an operation that is associated with the decoded message further comprising:
   opening a web page responsive to decoding the message encoded within the reconfigured machine readable image.

7. The method of claim 5, wherein performing an operation that is associated with the decoded message further comprising:
   opening a media file responsive to decoding the message encoded within the reconfigured machine readable image when the decoded message is associated with the media file.

8. The method of claim 1, wherein the machine readable image is one of a QR code and a bar code.

9. A computer program product embodied in a tangible storage medium and comprising instructions that when executed by a processor perform a method, the method comprising:
   capturing, by an input module of a reader device, a machine readable image encoded with a message;
   recognizing, by a test module of the reader device, the machine readable image has been graphically transformed to render a message encoded therein inaccessible;
   graphically reconfiguring, by a configuration module of the reader device, the machine readable image to a form that is decodable, if the machine readable image is transformed; and
   decoding, by a read module of the reader device, the reconfigured machine readable image to retrieve the message encoded therein.

10. A method comprising:
    capturing, by an input module of a reader device, a machine readable image encoded with a message;
    recognizing, by a test module of the reader device, the machine readable image has been graphically transformed to render a message encoded therein inaccessible;
    transmitting the machine readable image to a server to graphically reconfigure and decode the machine readable image resulting in retrieving the message encoded therein; and
    receiving the decoded message from the server.

11. A method, comprising:
    receiving, at a server from a reader device, a machine readable image that is graphically transformed to render a message encoded therein inaccessible;
    graphically reconfiguring, by the server, the transformed machine readable image to a form that is decodable through the reader device;
    decoding, by the server, the reconfigured machine readable image to retrieve the data; and
    transmitting, from the server to the reader device, the data decoded from the reconfigured machine readable image.

12. A computer program product tangibly embodied in a storage medium and comprising instructions that when executed by a processor perform a method, the method comprising:
    generating a second machine readable image by graphically transforming a first machine readable image representative of data to render the data inaccessible by a reader device absent a configuration module, wherein the configuration module is configured to graphically transform the second machine readable image back to the first machine readable image that is decodable by the reader device to retrieve the representative data, outputting the graphically transformed machine readable image.

13. The computer program product of claim 12, wherein the step of transforming comprises changing image characteristics of the first machine readable image.

14. The computer program product of claim 13, wherein changing image characteristics comprises changing a layout of the machine readable image.

15. The computer program product of claim 13, wherein changing image characteristics comprises changing a color characteristic of the machine readable image.

16. The computer program product of claim 12, wherein the machine readable image is a QR code.

17. The computer program product of claim 12, wherein the machine readable image is a multi dimensional bar code.

18. The computer program product of claim 12, wherein the transformed machine readable image is embedded with a graphical identifier in, wherein the graphical identifier facilitates a decoding of the transformed image.

* * * * *